(12) United States Patent
Lin

(10) Patent No.: US 6,974,244 B1
(45) Date of Patent: Dec. 13, 2005

(54) HAND-HELD WAND MIXER

(76) Inventor: King-Yuan Lin, 17530 28B Avenue, Surrey, B.C. (CA), V3S 0E7

(*) Notice: Subject to any disclaimer, the term of this patent is extended or adjusted under 35 U.S.C. 154(b) by 0 days.

(21) Appl. No.: 10/295,389

(22) Filed: Nov. 15, 2002

(51) Int. Cl.$^7$ .......................... A47J 43/044; A47J 43/07
(52) U.S. Cl. ........................................ 366/129; 366/331
(58) Field of Search ................................ 366/129, 331, 366/344; 99/348; 403/349, 359.1

(56) References Cited

U.S. PATENT DOCUMENTS

| | | | |
|---|---|---|---|
| 2,380,952 A | * | 8/1945 | Dewey ........................ 464/182 |
| 2,805,050 A | * | 9/1957 | Ghislain .......................... 415/8 |
| 3,117,769 A | * | 1/1964 | Werner ........................ 366/129 |
| 3,299,924 A | * | 1/1967 | Rudolf ........................ 366/129 |
| 3,333,830 A | * | 8/1967 | Werner ........................ 366/129 |
| 4,405,998 A | * | 9/1983 | Brison ........................ 366/264 |
| 4,723,719 A | * | 2/1988 | Williams ................. 241/282.2 |
| 4,739,885 A | * | 4/1988 | Noland et al. .............. 206/553 |
| 4,756,638 A | * | 7/1988 | Neyret ........................ 403/261 |
| 4,850,699 A | | 7/1989 | Rebordosa |
| 5,366,286 A | | 11/1994 | Rüttimann |
| 5,368,384 A | * | 11/1994 | Duncan et al. .............. 366/129 |
| 5,411,350 A | * | 5/1995 | Breault ........................ 403/350 |
| 5,567,047 A | | 10/1996 | Fritsch |
| 5,655,649 A | | 8/1997 | Lazzer |
| 5,803,598 A | | 9/1998 | Harry et al. |
| 5,810,472 A | | 9/1998 | Peñaranda et al. |
| 5,836,684 A | | 11/1998 | Safont et al. |
| 5,863,118 A | | 1/1999 | Ackels et al. |
| 5,904,420 A | * | 5/1999 | Dedoes ........................ 366/198 |
| 5,939,961 A | | 8/1999 | Fevre |
| 6,186,056 B1 | | 2/2001 | Bruno et al. |
| 6,186,656 B1 | | 2/2001 | Peñaranda et al. |
| 6,193,404 B1 | | 2/2001 | Calange |
| 6,293,691 B1 | | 9/2001 | Rebordosa et al. |
| 6,523,990 B1 | * | 2/2003 | Lee ........................... 366/129 |
| 2002/0136086 A1 | * | 9/2002 | Gili et al. ................... 366/129 |
| 2003/0156899 A1 | * | 8/2003 | Penarada et al. ........... 403/325 |

FOREIGN PATENT DOCUMENTS

| | | | |
|---|---|---|---|
| DE | 3307023 | * | 8/1984 |
| FR | 2553278 | * | 4/1985 |
| FR | 2770121 | * | 4/1999 |
| FR | 2794017 | * | 12/2000 |
| JP | 1-304031 | * | 12/1989 |
| WO | 02/03842 | * | 2/2004 |

* cited by examiner

Primary Examiner—Charles E. Cooley
(74) Attorney, Agent, or Firm—Todd N. Hathaway

(57) ABSTRACT

A wand mixer having a wand assembly that is detachable from the motor assembly as a single unit. The wand assembly includes a drive shaft that is enclosed within a tubular housing having a seal at the lower end for preventing entry of fluids and debris. First and second bearings at the ends of the tubular housing support both ends of the shaft so as to prevent deformation and damage of the seal when the wand assembly is removed from the motor assembly for cleaning. The wand assembly mounts to the motor assembly using a bayonet-type connection, and the motor and drive shafts are interconnected by an externally splined member that is received axially in an internally splined sleeve. The wand assembly can therefore be removed or mounted to the motor assembly by a convenient, manual turning and axial movement of the components.

22 Claims, 4 Drawing Sheets

HAND-HELD WAND MIXER

BACKGROUND OF THE INVENTION a. Field of the Invention

The present invention relates generally to portable electrical mixers, and, more particularly, to a hand-held wand mixer for mixing, chopping, blending, and general processing of food items and similar materials.

b. Background Art

In the commercial food service industry, as well as certain other fields such as the chemical and pharmaceutical industries, it is common to utilize comparatively large, hand-held electric mixers for the bulk preparation of food items and other products. Examples of such food items include various batters, soups, salads, and so on. Such mixers are generally used in combination with a large bowl or other mixing vessel in which the food items or other materials are combined. A variety of attachments and tools are employed, such as chopper blades, whisks, kneading tools or comminuting rods, to mix, blend, whip, chop or emulsify the food or other material to the desired consistency.

A particular class of such mixers is commonly referred to as "wand mixers". Wand mixers typically include an electric motor enclosed within a housing at the upper end of the mixer, and an elongate "wand" portion that encloses the drive shaft leading to the mixing attachment. In operation, the motor housing is usually held in one of the operator's hands while the elongate wand portion is gripped in the other, so that the operator is able to exert the control and leverage necessary to move the tool through the mixture.

The drive shaft is coupled to the rotating motor shaft and extends downwardly a substantial length (e.g., 12–18 inches) iii order to provide reach for the processing tool that is mounted to its lower end. The elongate wand portion typically has a tubular configuration and usually includes a bearing at its lower end for lateral support of the drive shaft, the upper end of the drive shaft being supported by its attachment to the output end of the motor shaft. In addition, the tubular housing normally supports a protective blade guard at its lower end, typically an open ended, somewhat bell shaped cup which encompasses the chopper blade but includes lateral openings that allow the mixture to flow to and from the chopper blades or other mixing tool. The primary function of the blade guard is to protect the user and food containment vessel from the rotating blades, and it also reduces splashing during the processing of low viscosity foods The mixing process is inherently messy, and the processing tool, blade guard and tubular housing invariably become covered with particulate food or other residue. In addition, the rapidly rotating tool or blade often acts somewhat like a pump, generating upward flow that tends to force residue into the tubular housing where the drive shaft emerges. Because the drive shaft bearing and other moving parts reside within the housing, any influx of contaminate material may degrade the integrity of these components. Furthermore, any food residue that evades the cleansing process can quickly become a source of bacterial contamination, posing potentially serious health consequences.

Consequently, many efforts in the prior art have focused on improving the hygienic and sanitary aspects of such mixers. In some instances, these have taken the form of modular assemblies that can be dismantled for cleaning. Such designs generally accept the notion that debris and fluids will enter the tubular housing and thus require disassembly for cleaning. In one example, a removable drive shaft bearing is used so as to allow the drive shaft and other internal components to be withdrawn from the housing tube for cleaning, and in another example, the tubular housing is configured in two portions that detach and break down to provide access to their internal components. While such approaches may help ensure that the mixer is safely sanitized, the disassembly and re-assembly that is required is both tedious and time consuming. In addition, such assemblies tend to be complex and expensive to produce.

Other devices have taken the approach of improving the sealing mechanism at the bottom of the mixer wand, in an effort to prevent debris and fluids from entering the tubular housing to begin with. While some of these designs may reduce the amount of seepage entering the tubular wand during operation of the mixer, their general design is such that the sealing mechanism is rendered ineffective during actual cleaning of the assembly. For instance, due to the weight and bulk of the motor assembly, plus the fact that most motor housings are not intended to be fully immersible, it is generally required that the drive shaft and its tubular housing be removed from the motor for cleaning. However, the spatial relationship of the drive shaft within the tubular housing generally relies on the motor shaft bearing and the bearing at the lower end of the wand. Thus, when the drive shaft and its housing are detached from the motor assembly, the free end of the drive shaft (which was previously coupled to the motor shaft) is released from its fixed spatial relationship with the tubular housing and tends to bend or pivot within the housing as the assembly is cleaned, inevitably causing deformation of the seal at the opposite end. Water and debris then enter the tubular housing through the deformed seal and contaminate the internal components.

Yet another deficiency of this configuration is that the lateral loads imparted to the upper end of the drive shaft during operation of the mixer must be reacted by the motor bearing alone. The added loading results in increased motor wear, thus reducing motor longevity and increasing maintenance requirements.

Accordingly, there exists a need for hand-held wand mixer that can be thoroughly cleaned and sanitized without requiring disassembly of the wand portion of the mixer. Furthermore, there exists a need for such a mixer having an improved sealing mechanism which ensures that both debris and fluids cannot contaminate or degrade the internal components of the shaft assembly, even during cleaning. Still further, there exists a need for such a mixer that provides increased motor longevity and reduced maintenance. Still further, there exists a need for such a mixer having a construction that allows convenient disassembly when actual maintenance or repair is required. Still further, there exists a need for such a mixer that avoids excess complexity and is economical to produce.

SUMMARY OF THE INVENTION

The present invention has solved the problems cited above, and is a hand-held wand mixer for mixing food items and other materials.

Broadly, the mixer comprises (a) a motor assembly comprising: a housing configured for manual manipulation, a motor substantially enclosed in the housing and having a motor shaft, and a first drive connection mounted to an output end of the motor shaft; and (b) a detachable wand assembly comprising: an elongate shaft housing having upper and lower ends, an elongate drive shaft substantially enclosed in the shaft housing and having upper and lower ends, the lower end of the drive shaft being configured for mounting a mixer tool thereto, a seal member mounted around the lower end of the drive shaft so as to seal the lower end of the shaft housing against entry of fluids and debris, upper and lower bearing members mounted in said shaft housing proximate the upper and lower ends thereof so as to support the upper and lower ends of the drive shaft against lateral movement, a second drive connection mounted to the upper end of the drive shaft for engaging the first drive connection on the output end of the motor shaft, and means for detachably mounting the upper end of the shaft housing to the motor assembly so that the first and second drive connections are held in engagement during operation of the mixer.

The mixer may further comprise means for detachably mounting a processing tool to the lower end of the drive shaft, and the shaft housing may further comprise a blade guard mounted on the lower end thereof the shaft tube so as to partially envelope the processing tool.

The drive connections between the motor shaft and drive shaft may comprise an eternally-splined male member and an internally-splined female member that receives the externally splined member axially therein. The drive shaft may comprise an elongate primary shaft having a relatively large diameter for efficient transmission of torque, and first and second stub shafts mounted coaxially at the ends thereof, the stub shafts having relatively smaller diameters for engaging inner races of the upper and lower bearings. The lower stub shaft may have a threaded lower end for threaded attachment of the mixing tools thereto, allowing a variety of processing tools to be easily exchanged or removed for cleaning. The upper stub shaft, in turn, may have an upper end having one of the drive connections mounted thereto.

The drive shaft has a substantial length in order that the processing tool can fully access deep bowls and other vessels. As noted above, this extended length has the potential for generating significant bending loads on the motor bearings if not otherwise reacted, particularly when processing viscous substances. Unlike prior mixers which rely on the motor bearing to support the upper end of the drive shaft, the tubular shaft housing and upper and lower bearings in the present invention provide lateral support for both ends of the drive shaft. The motor bearing loads are therefore reduced, providing increased motor longevity and reduced maintenance. As discussed below, the drive shaft is also held against bending or pivoting when the wand assembly is removed for cleaning, thus preserving the integrity of the seal member at the lower end of the assembly.

The upper end of the shaft housing is secured to the motor housing by a detachable coupling, which may comprise a bayonet-type coupling. The female portion of the bayonet coupling may comprise a hollow coupling member that is mounted at the upper end of the shaft housing and has an enlarged upper end that forms an enlarged mating surface for the coupling, with slots and grooves that form the female portion of the coupling being recessed into the mating surface. The male portion of the bayonet coupling may comprise a corresponding mating surface and male lugs mounted on the lower end of the motor housing. The large contact area between the mating surfaces on the motor and shaft assemblies at the bayonet joint effectively reacts any bending loads, providing a secure, stable connection that reducing stresses in the motor housing.

In combination with the detachable, slide-apart coupling between the drive shaft and motor shaft, the bayonet-type coupling forms a quick-detach connection that allows the wand assembly to be removed from the motor assembly as a single unit and without use of any tools. This greatly facilitates the cleaning process, since the exterior components that are likely to be covered with debris can be cleaned without additional disassembly: As noted above, the seal member encloses the lower end of the tubular housing and prevents debris and fluids from entering, so that full disassembly is not normally required in order to achieve proper cleaning and sanitation.

The seal member at the lower end of the shaft housing may comprise a cupped plug insert having a generally circular end wall and a cylindrical body diametrically sized to allow sliding insertion within the lower end of the tubular shaft housing. The lower stub shaft extends downwardly through a central opening in the end wall. A resilient sleeve may extend upwardly around the opening, and there may be a spring member mounted around the sleeve so as to bias the sleeve inwardly against the surface of the stub shaft.

The plug insert may further comprise a plurality of resilient tab portions that extend upwardly from the cylindrical wall so as to detachably secure the plug insert in the lower end of the tubular housing. Each of the tab portions may comprise a tapered lip on an outer surface thereof for detachably engaging a cooperating groove formed an inner surface of the tubular housing. The resiliency of the tabs allows the tabs to deflect inwardly as the cup-shaped pug is inserted, and then expand outwardly to engage the locking groove when the plug is fully inserted.

The seal assembly may further comprise a gasket mounted concentrically about the cylindrical body of the seal plug so as to form a seal between the inside surface of the tubular housing and the outer surface of the cylindrical body.

The seal plug provides an effective barrier that prevents liquids and debris from entering the tubular shaft housing. Because both upper and lower ends of the drive shaft are supported by bearings that are mounted in the shaft housing itself, the concentric spatial relationship between the shaft and its housing is maintained at both ends even when the wand assembly is removed from the motor housing. Consequently, the drive shaft cannot tilt or pivot within the tubular housing during cleaning, which, as was noted above, is a common source of seal damage and leakage in prior mixers.

At such time that actual repair or maintenance, the wand assembly can be disassembled by removing the splined member from the upper end of the drive shaft. The seal plug can then be extracted from the lower end of the tubular housing, allowing the drive shaft and bearings be axially withdrawn from the bottom of the housing as a unit. The internal components can then be further disassembled for maintenance, repair, or replacement.

The invention, together with further aspects and advantages thereof, will be further understood by reference to the following detailed description and accompanying drawings.

DETAILED DESCRIPTION a. Motor and Motor Housing

Figure 1:
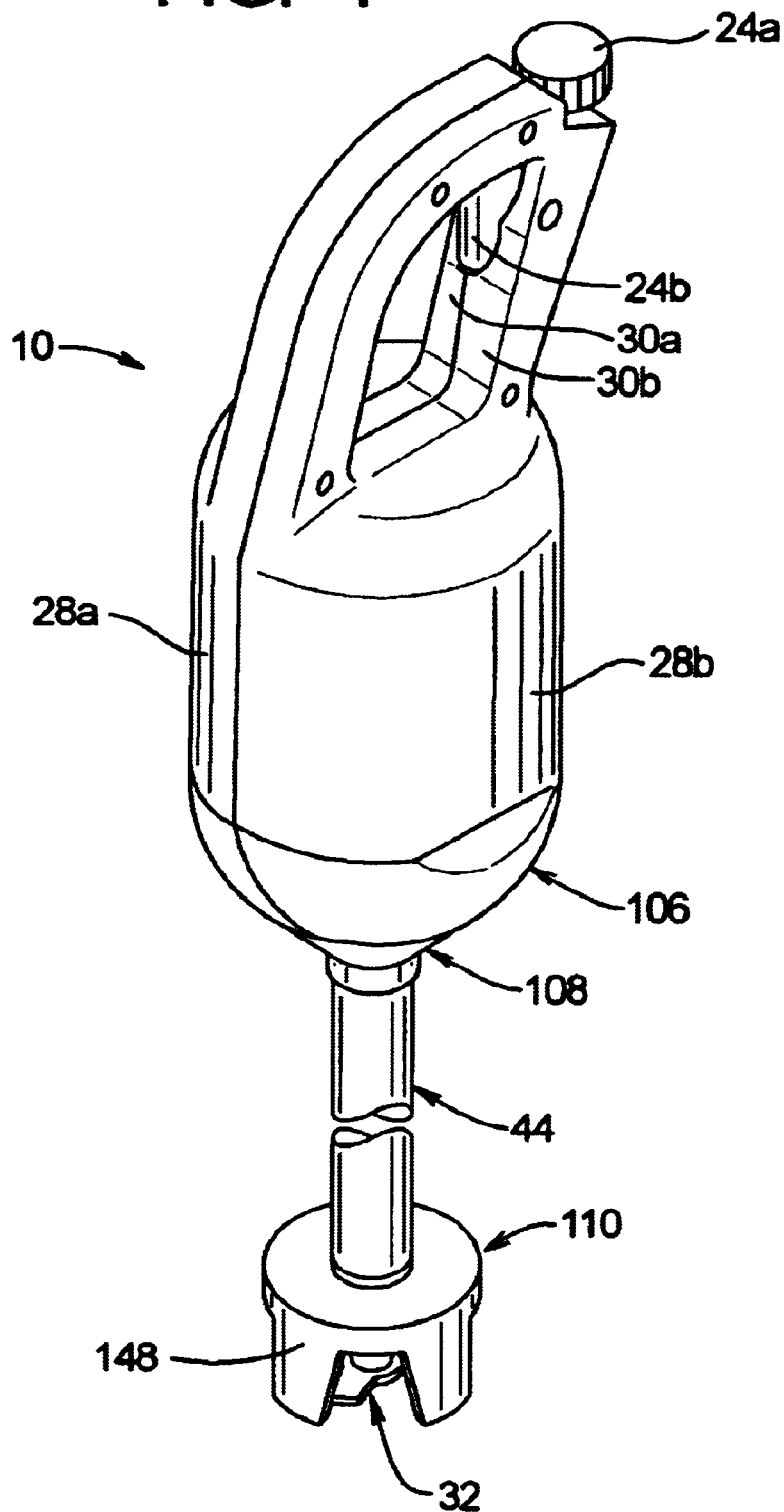
FIG. 1 is an isometric view of a hand-held wand mixer in accordance with the present invention.
Figure 2:
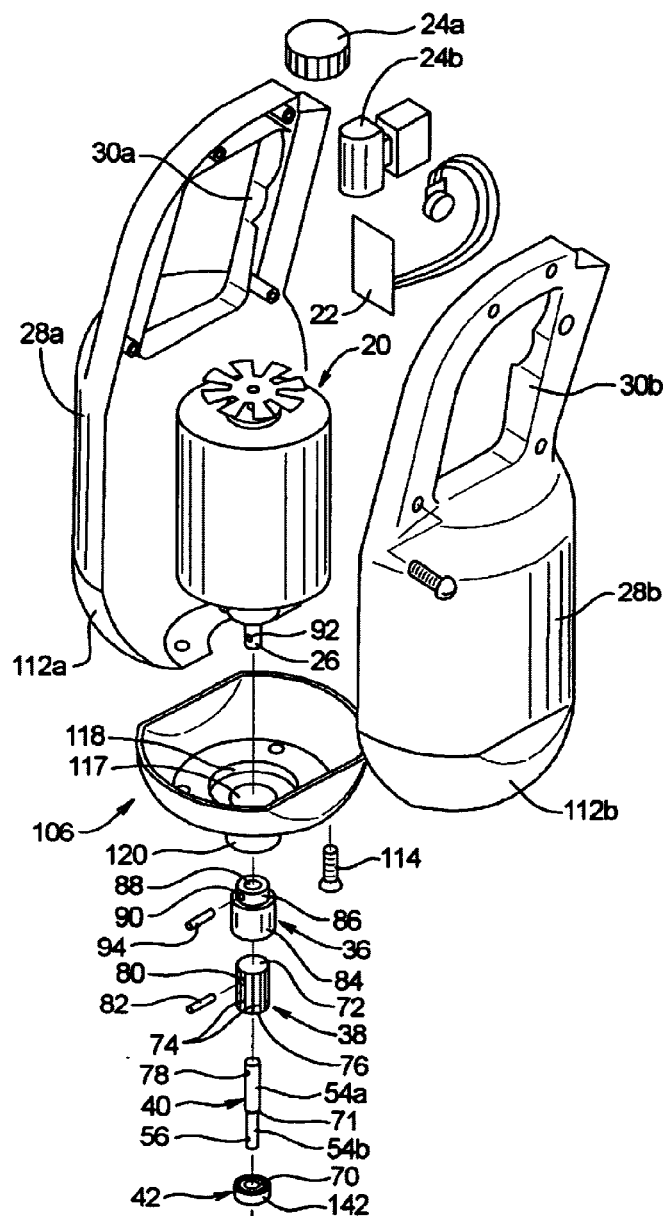
FIG. 2 is an exploded isometric view of the hand-held mixer of FIG. 1, showing the internal components of the motor and detachable wand assemblies.
Figure 2:
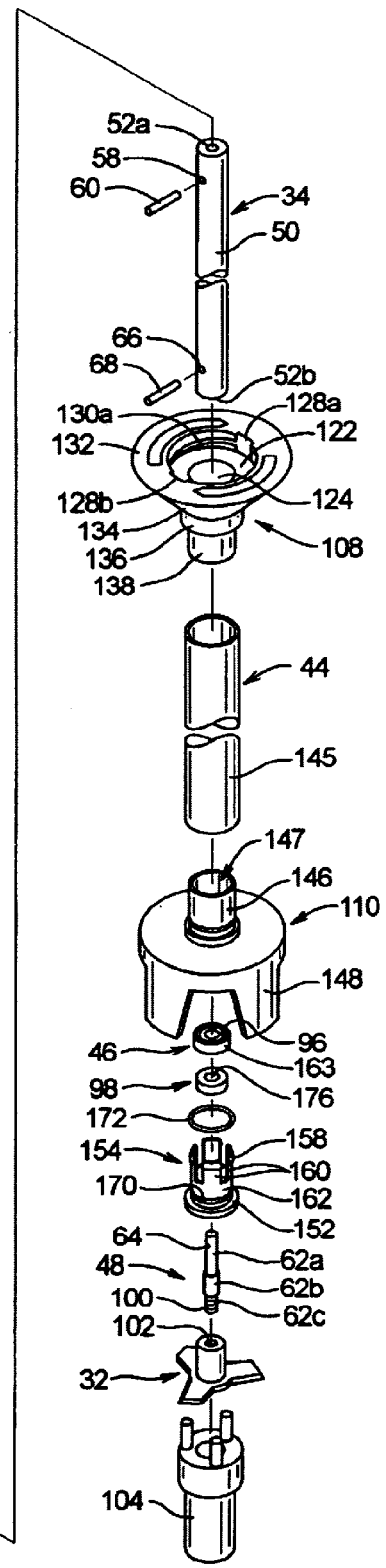

FIG. 1 provides an isometric overview of a hand-held wand mixer 10 in accordance with the present invention, while FIG. 2 provides an exploded isometric view of the mixer. As shown in these figures, the mixer is powered by a generally conventional, variable speed electric motor 20, of a type typically used for such applications, and includes appropriate control circuitry 22 and manually operable switches and controls 24a,b. Output from the motor is delivered by a motor shaft 26, which typically rotates at speeds of approximately 3000 to 10,000 rpm. To provide splash protection and guard the user against shock and moving parts, the motor 20 is enclosed within a protective motor housing 28a,b having an integrated handle 30a,b that provides a handgrip for manipulating the mixer. The motor housing 28a,b, may be constructed of any suitable strong, lightweight material, such as plastic or aluminum, but is preferably molded from impact-resistant plastic due to its durability and low production costs.

b. Drive Shaft Assembly

Figure 3:
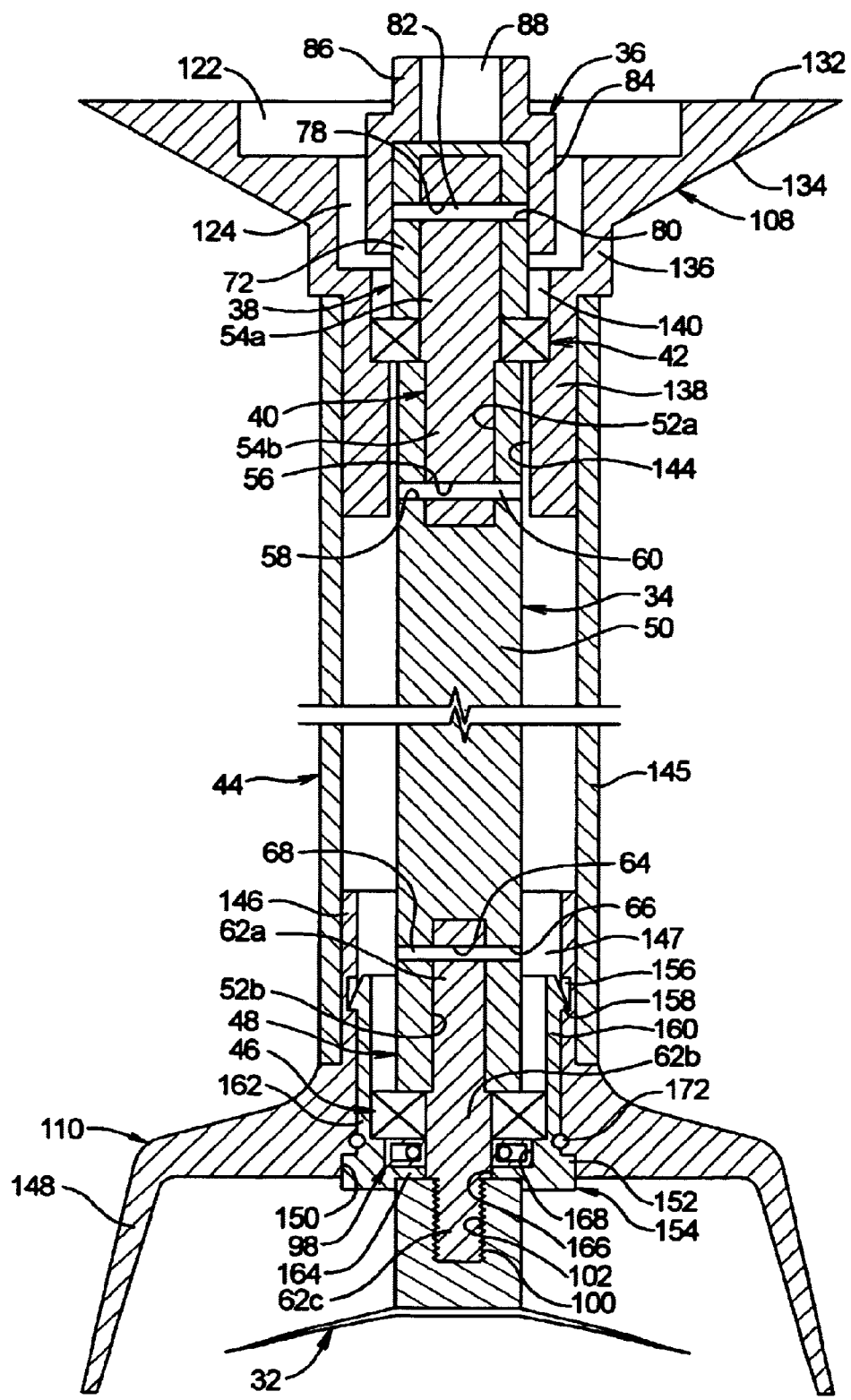
FIG. 3 is a sectional view of the wand mixer of FIGS. 1–2, showing the manner in which the upper and lower bearings of the wand assembly stabilize the drive shaft so as to prevent damage to the shaft seal when detached from the motor assembly.

Reference is made to FIG. 3, a section view of the lower end of the mixer assembly, which provides additional construction details not shown in FIG. 1 and FIG. 2. Reference indicia not appearing in FIG. 2 due to scale or angle of view will generally be displayed in FIG. 3, and vice versa. Furthermore, it will be understood that the terms upper, lower, top, bottom, and so on, as used in this description and the appended claims, reference the motor assembly as it appears in the figures, with the motor representing the upper end of the mixer and the distal end of detachable wand representing the lower end.

Rotational power is delivered from the motor shaft 26 to the processing tool 32 via a drive shaft assembly 34. In the embodiment illustrated in FIG. 3, the drive shaft assembly 34 includes an internally-splined coupling socket or sleeve 36 that slidingly receives an cooperating, axially aligned, externally-splined member 38 so as to form a detachable rotational coupling. The externally splined member 38 is mounted to the end of a stub shaft 40 that serves as an axle for the upper shaft bearing 42, and that joins the splined member to the primary drive shalt 50. The upper bearing 42 stabilizes the upper end of the drive shaft within the shaft housing 44, while a lower bearing 46 likewise supports a lower stub shaft 48 so as to stabilize the lower end of the drive shaft within the housing. Additionally, the lower stub shaft 48 serves to join the main drive shaft 50 to the processing tool 32.

The primary drive shaft 50 is an elongate, substantially cylindrical member having a length (e.g., approximately 36 centimeters) suitable to provide: adequate reach when working with deep food mixing vessels, and a diameter (e.g., approximately 0.6 centimeters) that provides adequate torsional strength to perform the required processing operations. The primary shaft 50 may suitably be constructed of a strong, preferably corrosion resistant material such as aluminum or stainless steel.

Each end of the primary drive shaft 50 includes an axial, concentric bore 52a, 52b for attachment of the respective stub shafts 40, 48. The upper bore 52a is configured for close-fitting, sliding insertion of the lower portion 54b of the upper stub shaft 40. When fully inserted, a transverse through-hole 56 in the stub shaft aligns with a corresponding through-hole 58 in the upper end of the primary drive shaft 50, and a press-fit pin 60 is passed through the openings so as to secure the stub shaft in place. In a like manner, the lower bore 52b receives the upper section 62a of the lower stub shaft 48, and the two are secured together by passing a pin 68 through cooperating openings 64 and 66.

In the illustrated embodiment, stub shafts 40, 48 and pins 60, 68 are suitably fabricated from stainless steel. However, other suitably strong, long-wearing, corrosion resistant materials may be employed. Furthermore, while the pinned connection between the stub and primary shafts has the advantages of simplicity and ease of assembly, it will be understood that alternative connections may be used in other embodiments. Still further, it will be understood that some embodiments may employ a one-piece drive shaft rather than a built-up assembly with separate stub shafts as shown in the figures.

The upper section 54a of stub shaft 40 is sized diametrically to accept the inner race 70 of the upper drive shaft bearing 42. In the illustrated embodiment, the upper bearing is a standard, off-the-shelf, food-grade roller bearing. However, other bearing types, such as a self-lubricating ceramic or polymer sleeve bearing may be substituted. Upon installation, the lower face of the roller bearing inner race 70 seats against a shoulder that is formed at the upper end of the primary drive shaft 50 between the larger-diameter primary shaft 50 and the smaller-diameter stub shaft 40; the bearing is secured on its upper side by subsequent installation of the externally splined member 38, the latter having a lower surface that engages the upper surface of the inner race of the bearing.

The short, comparatively small-diameter stub shafts at the ends of the shaft assembly permit the use of upper and lower bearings having correspondingly small-diameter inner races, so that the bearings have adequate load capacity without requiring large-diameter outer races. This in turn allows the beings to fit within the shaft housing without the need for a bulky, oversized tube or housing that would be cumbersome or difficult to grip. The larger diameter of the primary shaft 50, in turn, imparts an increased torsional rigidity that enables it to effectively transmit torque over the distance between the upper and lower ends of the assembly without developing an undesirable twisting or whipping motion.

As noted above, the externally splined member 38 is mounted on the upper end of stub shaft 40. The externally splined member comprises a cylindrical body 72, similar to a gear, having a plurality of spaced, longitudinally extending external splines 74. A cylindrical boss 76 on the lower end of the splined body creates an annular bearing face that mates generally diametrically with the upper face of the inner race 70 of bearing 42. An axially aligned bore (not shown) extends into the splined body 72 through boss 76 to receive the upper section 54a of stub shaft 40, and a press-fit pin 82 passes through cooperating transverse 78, 80 in the stub shaft and splined member to secure the two together. As with the stub shafts, it will be understood that alternative forms of connection may be employed.

Coupling socket 36, in turn, comprises a hollow, generally cylindrical body 84 having a mounting boss 86 projecting from its upper end. The mounting boss includes an axial bore 88 that receives the output end of motor shaft 26 and is secured thereto by a press fit pin 94 inserted through cooperating transverse bores 90, 92. The lower end of the coupling socket, in turn, is formed with an axial opening (not shown) that is sized to receive the externally splined member 38. A plurality of spaced, longitudinally extending splines (not shown) on the interior of the hollow body 84 of the socket slidingly interfit with and engage the external splines 74 on member 38 in drive engagement, so as to provide a rotational coupling between the motor and drive shafts 26, 50.

The splined members 36, 38 are suitably molded from a tough, durable polymer material, due to its economical manufacture and self-lubricating properties, however, other materials suitable for use in gears and power transmission components may also be employed. In the illustrated embodiment, the externally splined member is mounted to the drive shaft and the internally splined member is mounted to the motor shaft, however, it will be understood that this arrangement may be readily reversed. Furthermore, it will be understood that a wide variety of other forms of drive couplings may be employed that have cooperating features that engage and disengage in response to relative movement between the drive and motor shafts.

As noted above, the lower stub shaft 48 engages the lower shaft bearing and also provides an extension for the attachment of various processing tools. Accordingly, the middle section 62*b* of the lower stub shaft is sized diametrically to fit within the inner race 96 of lower bearing 46. As with the upper bearing 42, the lower bearing is suitably an off-the-shelf, food grade roller bearing, although other types of bearings may be used. Upon installation the upper face of the inner race 96 seats against the lower end of the primary drive shaft 50, with the middle section 62*b* of the stub shaft being sized longer than the bearing depth so that a portion is exposed below the bearing to provide a sealing surface for gasket 98, as will be described in greater detail below.

The lower end 62*c* of the stub shaft 48 is provided with external threads 100 that engage corresponding internal threads 102 on processing tool 32. The thread direction is preferably oriented with respect to the direction of motor rotation such that the motion tends to tighten the threaded connection during operation. For cleaning or replacement with another tool, the processing tool 32 is simply unscrewed from the lower coupling stud 48 by hand or using an accessory tool 104 that engages the blades. In addition to the threaded connection, any suitable form of connection between the shaft and processing tool may be used.

c. Bayonet Connection

Figure 4:
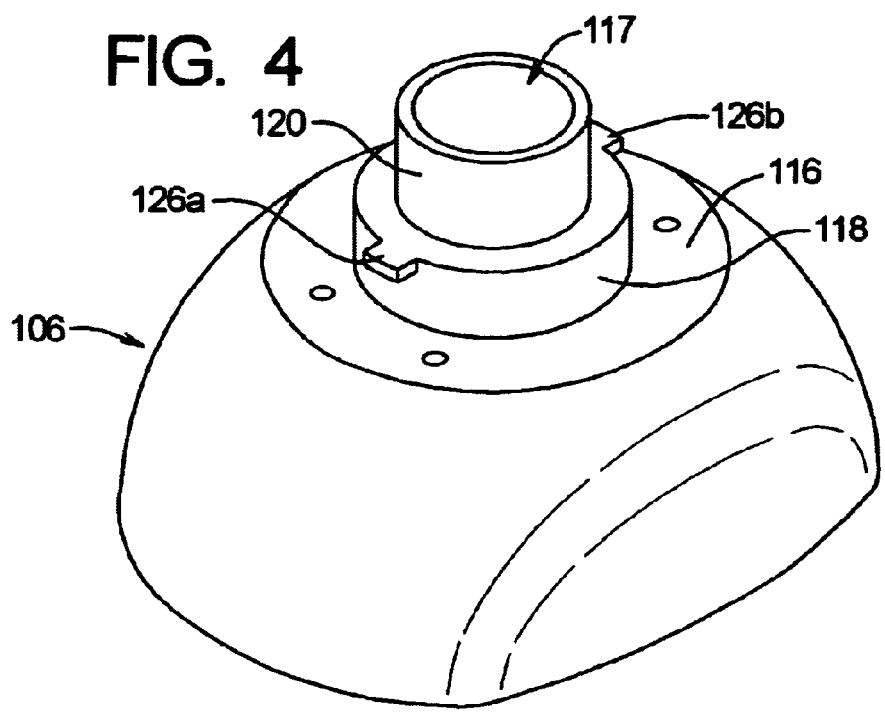
FIG. 4 is an isometric view of the base structure of the motor assembly of the mixer of FIGS. 1–2, showing the projecting lugs thereon that form the male portion of bayonet-type connection with the detachable wand assembly.
Figure 5:
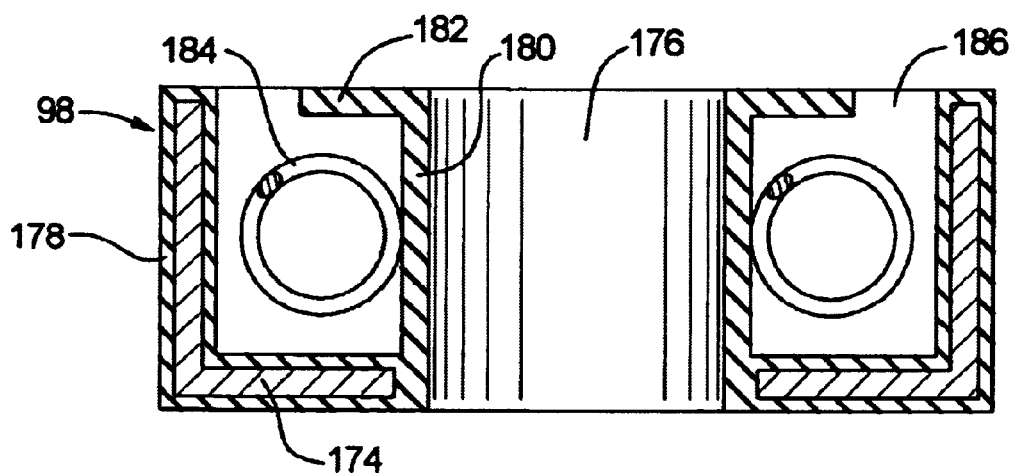
FIG. 5 is a sectional view of the removable plug that seals the lower end of the wand assembly of the mixer of FIGS. 1–2.

Referring now to FIG. 4, it can be seen that the motor assembly of the preferred embodiment includes a rigid base member 106 that is mounted to the lower end of the plastic motor housing 28*a*, 28*b* by mechanical fasteners 114 or other conventional means, and that forms the first half of a bayonet-type coupling that engages a cooperating member 108 that is mounted on the upper end of the shaft housing.

The base member 106 has a generally convexly contoured configuration that conforms to the lower surface 112*a,b* of the motor housing, so that loads transmitted from the drive shaft housing are distributed into the motor housing and point stresses are minimized. The base member also provides impact protection in the areas where the housing sustains repeated contact with the edges of bowls and containment vessels during use. In the embodiment illustrated in the figures, the housing cup 106 is suitably constructed of cast aluminum owing to its low weight, corrosion resistance and good strength and impact resistance qualities; however, other materials that provide similar characteristics, such as impact-resistant molded plastic, may also be used.

As can be seen with further reference to FIG. 4, the lower portion of the base member 106 includes a generally flat, circular face 116 which serves as the upper parting surface for the joint that is formed with the coupling member on the detachable shaft housing. A central opening 117 in face 116 allows passage of the drive shaft therethrough, the opening being surrounded by stepped, substantially cylindrical tubes 118, 120 that serve as alignment features which nest within stepped, concentric recesses 122, 124 in the coupling member 108 on the shaft housing.

A pair of opposed, generally rectangular lugs 126*a*, 126*b* protrude radially from the first stepped tube 118 to form the male features of the bayonet connection, and are configured for axial insertion within corresponding slots 128*a,b*, that are formed in the coupling member 108. In response to subsequent relative rotation of the coupling member 108, lugs 126*a,b* track within cooperating spiral grooves 130*a,b* (130*b* not shown) so as to draw the base member 106 and coupling member 108 towards one another. As this is done, the parting face 116 on base member 106 moves into contact with corresponding parting face 132 on coupling member 108, so that frictional contact develops between the lugs 126*a*, 126*b* and spiral grooves 130*a*, 130*b* which secures the joint against accidental disengagement. Disassembly is accomplished by rotating the components in the opposite direction and withdrawing coupling member 108 axially from base member 106.

Externally, coupling member 108 features an external taper 134 that terminates in a pair of stepped, generally cylindrical projections 136,138. The diameter of the lower projection 138 is sized with respect to the inner diameter of the main housing tube 44 to allow sliding insertion therein to which it is secured by adhesives, interference fit or other conventional means. The upper projection 136, in turn, serves as a mechanical stop that ensures proper insertion depth during assembly.

As noted above, the upper face 132 of member 108 serves as the lower parting surface for the bayonet joint that is formed with base member 106. The conical taper of the base cone provides upper face 132 with a large contact area at the joint interface, which increases stability and reduces stresses, and also provides an obstruction-free, easy to clean exterior. As also noted above, the stepped, concentric recesses 122, 124 serve as alignment features during assembly. A third stepped, concentric recess 140 (not shown in FIG. 2) extends downwardly from the bottom of the second recess 124 and provides a seating cavity that receives the upper bearing 42; the diameter of the third circular recess 140 is sized with respect to the outer race 142 of the upper bearing so as to provide a slight interference fit that secures the bearing within the recess, with the lower wall of the recess engaging the lower surface of the outer race of the bearing. A concentric bore 144 extends from the bottom of the third recess 140 for passage of the drive shaft therethrough.

In the illustrated embodiment the shaft housing coupling member 108 is suitably molded from fiber-reinforced plastic due to its high strength, low weight and low production cost, although aluminum or other suitable materials may be used, The main tube 145 of the housing, in turn, comprises a simple cylindrical tube having an appropriate length and diameter to enclose the drive shaft assembly. The upper end of the housing tube is configured to mate with the lower end of the coupling member 108 as previously described, with a similar connection being used to join the lower end of the tube to a cooperating, cylindrical projection 146 on the blade guard 110.

The blade guard 110 protects the user and food containment vessel from the rotating blades of the mixing tool, while also serving as a splashguard during the processing of low viscosity foods. The configuration of the guard may vary somewhat depending on the intended use and types of attachments used; in the illustrated embodiment, the guard comprises a hollow, somewhat bell-shaped cage 148 which circumferentially encompasses the processing tool 32 and projects a short distance below the lower end of the tool. A central bore 147 extends upwardly through the cage and cylindrical projection 146 to provide a shaft opening that communicates with the interior of the tube 145. An annular recess 150 is formed at the bottom end of the bore 147 to provide a seating pocket for a sealing plug 154 that encloses the end of the assembly, as will be described in greater detail below.

In the preferred embodiment, the main shaft tube 145 is constructed of stainless steel and the blade guard 110 is constructed of cast aluminum. However, the components may be constructed from other materials or as an integral part formed from a single material having appropriate characteristics.

d. Removable Seal Assembly

The removable seal assembly at the lower end of the shaft housing assembly creates a fluid-tight closure that prevents entry of food debris, fluids and other contaminate material. In the illustrated embodiment, the seal assembly comprises a cupped plug 154; formed of a resilient material such as nylon or other polymeric material, having a hollow cylindrical body 162 with an outside diameter sized to allow close-fitting, sliding insertion within the bore 147 of the blade guard. The inside diameter, in turn, is sized to receive the outer race 163 of the lower shaft bearing 46.

The lower end of the seal plug 154 is closed by a circular end wall 164 having a radially extending lip 152 that seats within annular recess 150. A circular opening 166 in the end wall accommodates the middle section 62*b* of lower stub shaft 48, the lower end of which extends below the seal for attachment of the processing tool 32.

A concentric recess 168 is formed on-the upper side of the end wall 164 to provide a receptacle for an inner seal 98 that forms a fluid-tight seal between the lower stub shaft 48 and the inside of seal plug 154. A concentric groove 170 on the outer circumference of the seal plug, in turn, accepts an O-ring 172 that forms a seal between the body 162 of the plug and the bore 147 of the blade guard.

A plurality of resilient coupling tabs 160, each having a tapered lip 158 on its outer surface, extend upwardly about the body of the seal plug. The tabs define an outer diameter sized relative to bore 147 such that the tabs are compressed radially as the plug is inserted into the bore. Upon reaching the annular locking groove 156, the tabs snap resiliently outwardly so that the tapered lips engage the groove to secure the plug in place. The locking tabs 160 and cooperating groove 156 thus facilitate rapid and efficient assembly of the components. The number of locking tabs is somewhat optional depending on material characteristics and other design factors, with between 2–6 tabs generally providing a satisfactory combination of quick assembly and adequate strength.

The outer gasket 172 is suitably a standard, off-the-shelf rubber O-ring. The inner. seal 98, in turn, is suitably a cupped, donut-shaped shaft seal, formed over a rigid steel core 174 and having a central bore 176. The compliant rubber 178 of the seal extends upwardly about the periphery of bore 176 so as to form a flexible sleeve 180 that terminates in a radially expanding flange 182. A suitably-sized coil spring 184 is retained in an annular recess 186 by flange 182, and exerts radially inward pressure against sleeve 180 so that the latter forms a seal against the rotating shaft 48.

e. Operation

The present mixer invention operates to mix food items or other materials in a manner generally similar conventional mixers. However, whereas conventional mixers require tedious and problematic disassembly in order to be effectively cleaned and sanitized, these chores are greatly simplified in the mixer of the present invention.

When cleaning is required, the coupling member 108 of the shaft assembly is simply rotated in the proper direction to disengage the bayonet connection and then withdrawn axially from the motor housing. The splined connection between the drive and motor shaft simultaneously disengages by simple axial extraction, so that the entire shaft assembly can be removed as a single unit. The upper and lower bearings 42,46 remain within the shaft housing and securely support the ends of the drive shaft 34, ensuring that the proper spatial relationship is maintained. Deformation of the fluid seal is thus avoided, and the exterior of the detached wand assembly can be cleaned and sanitized without risk of damaging the seal or contaminating the internal components of the assembly.

In the event that maintenance or replacement of parts is required, the seal plug 154 can easily be extracted from the blade guard aperture 147 due to the resilient locking tabs while pin 82 is driven out of the externally splined member 38. This allows the remaining drive shaft assembly components to be withdrawn through the lower end of the tubular housing for further disassembly.

The foregoing description of the preferred embodiment of the invention has been presented for the purpose of illustration and description. It is not intended to be exhaustive or to limit the invention to the precise form disclosed. Many modifications and variations are possible in light of the above teaching.

What is claimed is:

1. A hand-held wand mixer, comprising:
 (a) a motor assembly, comprising:
   a housing;
   a motor substantially enclosed in said housing and having a motor shaft; and
   a first drive connection mounted to an output end of said motor shaft; and
 (b) a detachable wand assembly, comprising:
   an elongate, shaft tube having upper and lower ends;
   an elongate drive shaft substantially enclosed in said shaft tube and having upper and lower ends, said lower end of said drive shaft being configured for attachment of a mixer tool thereto;
   a seal member mounted around said lower end of said drive shaft so as to seal said shaft tube against entry of fluids and debris;
   upper and lower bearing members mounted proximate said upper and lower ends of said shaft tube so as to support said upper and lower ends of said drive shaft axially therein;
   a second drive connection mounted to said upper end of said drive shaft for detachably engaging said first drive connection on said motor shaft;
   means for detachably mounting said upper end of said shaft tube to said housing of said motor assembly so that said wand assembly is mounted to said motor assembly and so that said first and second drive connections are maintained in drive engagement;

a concentric recess proximate said upper end of said shaft tube that receives said upper bearing member therein, said recess having a lower wall that engages a lower surface of an outer race of said upper bearing member;

a lower surface on said second drive connection that engages an upper surface of an inner race of said upper bearing member; and an upper surface on said drive shaft that engages a lower surface of said inner race of said upper bearing member, so that said surfaces in said recess and on said drive shaft and second drive connection cooperate with said upper bearing member to hold said shaft against axial movement within said shaft tube.

2. The wand mixer of claim 1, wherein said first and second drive connections are configured to freely engage and disengage in response to axial movement of said motor and wand assemblies towards and away from one another.

3. The wand mixer of claim 2, wherein said means for detachably mounting said shaft tube to said housing of said motor assembly comprises:

means for detachably mounting said upper end of said shaft tube to said housing of said motor assembly in response to axial movement of said shaft tube towards said motor shaft, so that said first and second drive connections move into engagement as said wand assembly is mounted to said motor assembly.

4. The wand mixer of claim 3, wherein said means for detachedly mounting said upper end of said shaft tube to said housing of motor assembly comprises:

a bayonet fitting mounted to said upper end of said shaft tube for engaging a cooperating bayonet fitting mounted on said housing of said motor assembly in response to relative axial and rotating-movement of said motor and wand assemblies.

5. The wand mixer of claim 4, wherein said bayonet fitting on said shaft tube comprises:

a first connector member mounted to said upper end of said shaft tube and having an upwardly facing recess for receiving said cooperating bayonet fitting on said housing of said motor assembly.

6. The wand mixer of claim 5, wherein said motor assembly further comprises:

a second connector member mounted on a lower end of said housing and having said cooperating bayonet fitting projecting downwardly therefrom for being received in said first connector member mounted to said shaft tube.

7. The wand mixer of claim 6, wherein said second connector member is formed of an impact resistant material and encases said lower end of said motor housing so as to protect said housing from damage during use.

8. The wand mixer of claim 3, wherein said first and second drive connections comprise first and second interfitting splined members mounted to said output end of said motor shaft and said upper end of said drive shaft.

9. The wand mixer of claim 8, wherein said first splined member comprises an externally splined member and said second splined member comprises an internally splined member for axially receiving said externally splined member in engagement therewith.

10. The wand mixer of claim 9, wherein said lower surface on said second drive connection that engages said upper surface of said inner race of said upper bearing member comprises:

a surface of a cylindrical lower boss on said externally splined member.

11. The wand mixer of claim 1, wherein said detachable wand assembly further comprises:

a pressed-in cap member mounted to said lower end of said shaft tube so as to retain said seal member therein.

12. The wand mixer of claim 11, wherein said cap member comprises:

a cap member having an aperture for passage of said lower end of said drive shaft therethrough, and a plurality of upwardly extending, resiliently flexible finger portions for engaging an internal recess proximate said lower end of said shaft tube so as to removably secure said cap member to said shaft tube.

13. The wand mixer of claim 12, wherein said wand assembly further comprises:

a guard member mounted to said lower end of said shaft tube so as to partially enclose said mixing tool on a lower end of said shaft and having a vertical bore for passage of said shaft therethrough.

14. The wand mixer of claim 13, wherein said recess for engaging said finger portions on said cap member comprises:

a generally annular recess formed in an inside wall of said vertical bore of said guard member, for engaging cooperating lips on ends of said tab portions so as to retain said cap member therein.

15. The wand mixer of claim 1, wherein said drive shaft comprises:

an elongate primary shaft extending over a majority of the length of said shaft tube, said primary shaft having a relatively larger outside diameter for enhanced transmission of torque between said ends of said shaft; and first and second stub shafts mounted coaxially to upper and lower ends of said primary shaft, said stub shafts having relatively smaller outside diameters for engaging inner races of said upper and lower bearing members that are mounted to said shaft tube.

16. The wand mixer of claim 15, wherein said second stub shaft comprises:

a lower end that protrudes downwardly below said lower bearing member and has said mixing tool mounted thereto.

17. The wand mixer of claim 16, wherein said first stub shaft comprises:

an upper end that protrudes upwardly above said upper bearing member and has said second drive connection mounted thereto.

18. The wand mixer of claim 17, wherein said upper surface on said drive shaft that engages said lower surface of said upper bearing member comprises:

a shoulder formed between said primary shaft having said relatively larger diameter and said first stub shaft having said relatively smaller diameter.

19. A hand-held wand mixer, comprising:

(a) a motor assembly comprising:

a housing having a hand grip;

a motor substantially enclosed in said housing and having a motor shaft;

a first splined member mounted on a downwardly extending output end of said motor shaft; and a first bayonet fitting mounted on a lower end of said housing; and (b) a detachable wand assembly, comprising:
  an elongate shaft tube having upper and lower ends;
  upper and lower bearing members mounted proximate said upper and lower ends of said shaft tube;
  an elongate drive shaft substantially enclosed in said shaft tube and having upper and lower ends, said drive shaft comprising:
    an elongate primary shaft extending over a majority of the length of said shaft tube, said primary shaft having a relatively larger outside diameter for enhanced transmission of torque between said ends of said drive shaft; and
    first and second stub shafts mounted coaxially to said upper and lower ends of said primary shaft portion, said stub shafts having relatively smaller outside diameters for engaging inner races of said upper and lower bearing members;
    said primary shaft having said relatively larger diameter and said first stub shaft having said relatively smaller diameter forming a shoulder therebetween having an upper surface that engages a lower surface of an inner race of said upper bearing member;
  a seal member mounted around said lower end of said drive shaft so as to seal said shaft tube against entry of fluids and debris;
  a mixer blade mounted to a lower end of said second stub shaft that protrudes downwardly below said lower bearing member and said seal member;
  a guard cage mounted to said lower end of said shaft tube so as to partially enclose said mixer blade;
  a second splined member mounted to an upper end of said first stub shaft that protrudes above said upper bearing member so as to engage said first splined member in drive relationship, said second splined member having a cylindrical boss with a lower surface that engages an upper surface of said inner race of said upper bearing member; and
  a second bayonet fitting mounted on said upper end of said shaft tube for detachably engaging said first bayonet fitting mounted on said motor housing so as to detachably mount said wand assembly to said motor assembly, said second bayonet fitting having a stepped, concentric recess that receives said upper bearing member and has a lower wall that engages a lower surface of an outer race of said upper bearing member, so that said surfaces in said recess and on said drive shaft and second splined member cooperate with said upper bearing member to hold said shaft against axial movement within said shaft tube.

20. The wand mixer of claim 19, wherein said wand assembly further comprises:
  a pressed-in cap member for detachably retaining said seal member proximate said lower end of said shaft tube.

21. A hand-held wand mixer, comprising:
(a) a motor assembly, comprising:
  a housing;
  a motor substantially enclosed in said housing and having a motor shaft;
  a first drive connection mounted to an output end of said motor shaft; and
  a first coupling member, comprising:
    first and second stepped, substantially cylindrical tubes having a central opening for passage of said first drive connection therethrough; and
    a first substantially flat, circular free extending annularly about said stepped tubes; and
(b) a detachable wand assembly, comprising:
  an elongate, shaft tube having upper and lower ends;
  an elongate drive shaft substantially enclosed in said shaft tube and having upper and lower ends, said lower end of said drive shaft being configured for attachment of a mixer tool thereto;
  a seal member mounted around said lower end of said drive shaft so as to seal said shaft tube against entry of fluids and debris;
  upper and lower bearing members mounted proximate said upper and lower ends of said shaft tube so as to support said upper and lower ends of said drive shaft axially therein;
  a second drive connection mounted to said upper end of said drive shaft for detachably engaging said first drive connection on said motor shaft; and
  a second coupling member for detachably mounting said upper end of said shaft tube to said housing of said motor assembly so that said wand assembly is mounted to said motor assembly and so that said first and second drive connections are maintained in drive engagement, said second coupling member comprising:
    first and second stepped, substantially concentric recesses that receive and cooperate with said first and second stepped, substantially cylindrical tubes of said first coupling member so as to guide said first and second coupling members into engagement; and
    a second substantially flat, circular face extending annularly about said stepped recesses, that engages said first circular face on said first coupling member so as to form a broad, stable joint between said first and second coupling members.

22. The hand-held want mixer of claim 21, further comprising:
  at least one projecting lug on the upper of said stepped tubes; and
  at least one recessed groove in the upper of said stepped recesses that receives said at least one lug in cooperating relationship;
  so that first and second coupling member cooperate to form a bayonet fitting that detachably mounts said upper end of said shaft tube to said lower end of said motor housing in response to relative axial and rotating movement of said motor and wand assemblies.

* * * * *